United States Patent [19]

Steinko

[11] Patent Number: 4,714,205

[45] Date of Patent: Dec. 22, 1987

[54] DEVICES FOR CRUSHING, MASHING AND/OR GRINDING FOODSTUFFS

[75] Inventor: Willi Steinko, Nassau, Fed. Rep. of Germany

[73] Assignee: Mike & Kremmel Ltd., Kowloon, Hong Kong

[21] Appl. No.: 903,873

[22] Filed: Sep. 2, 1986

Related U.S. Application Data

[63] Continuation of Ser. No. 635,386, Jul. 30, 1984, abandoned.

[30] Foreign Application Priority Data

Aug. 1, 1983 [GB] United Kingdom ............... 8320670

[51] Int. Cl.⁴ .................................... B02C 19/08
[52] U.S. Cl. ......................... 241/95; 241/169.2; 241/DIG. 27
[58] Field of Search ........... 241/168, 169, 169.1, 241/95, 169.2, 89.4, 89.2, DIG. 17, DIG. 27

[56] References Cited

U.S. PATENT DOCUMENTS

| | | | |
|---|---|---|---|
| 2,602,596 | 7/1952 | Jones et al. | 241/169.1 |
| 2,818,797 | 1/1958 | Ballor. | |
| 3,552,460 | 1/1971 | Cooney | 241/169.1 |
| 3,581,790 | 6/1971 | Del Conte | 241/169.1 X |
| 4,350,768 | 9/1982 | Tihon et al. | 241/169.2 X |
| 4,366,930 | 1/1983 | Trombetti, Jr. | 241/DIG. 27 X |

FOREIGN PATENT DOCUMENTS

| | | | |
|---|---|---|---|
| 52726 | 2/1937 | Denmark | 241/168 |
| 733979 | 10/1932 | France . | |
| 1128914 | 1/1957 | France | 241/168 |
| 2064947 | 6/1981 | United Kingdom . | |
| 2084862 | 4/1982 | United Kingdom . | |

*Primary Examiner*—Mark Rosenbaum
*Attorney, Agent, or Firm*—Townsend and Townsend

[57] ABSTRACT

A garlic press comprising a cylindrical housing and within that an axially movable ram. Movement of the ram is brought about by mating screw threads between the ram and plunger and twisting one relative the other. The housing has an open lower end which is closed by a perforated grinding plate which fits flushly within the lower end of the housing and is attached, as by screw threads, to the outside of the housing so that the inner end of the ram can fit closely within the housing and ensure full expulsion of all the garlic pieces and juice. An additional feature is a cover which encloses the lower end of the housing and the grinding plate to prevent drying out of the garlic and garlic smells when the device is not in use. This cover can fit with a skirt formed on the housing and can have a flat lower surface on which the whole device can stand upright when not in use.

14 Claims, 5 Drawing Figures

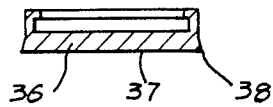
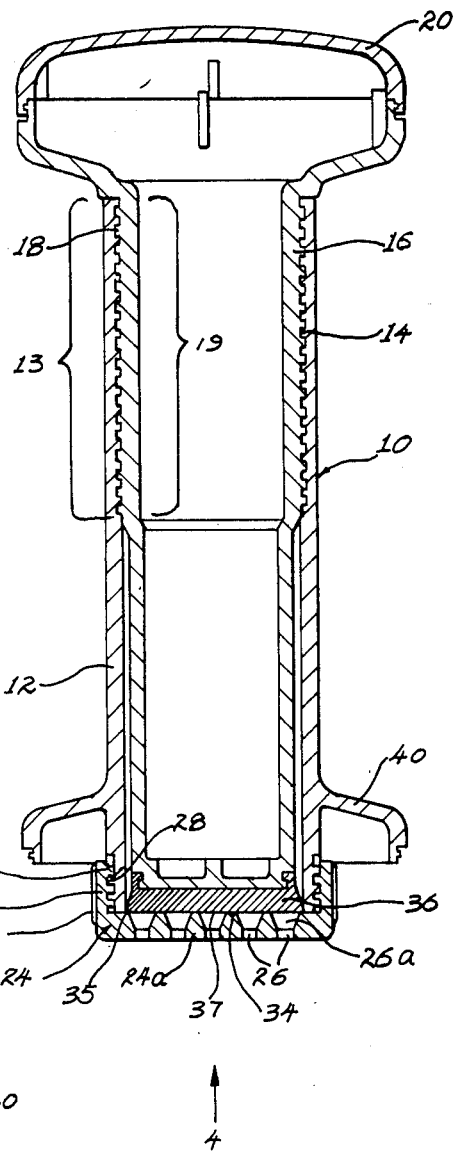
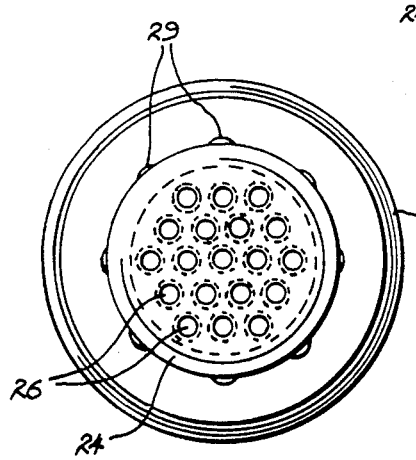

DEVICES FOR CRUSHING, MASHING AND/OR GRINDING FOODSTUFFS

This is a continuation of application Ser. No. 635,386, filed July 30, 1984, now abandoned.

This invention relates to devices for crushing, mashing and/or grinding foodstuffs such as garlic which are added during cooking in a finely divided and crushed form. In particular the invention relates to a garlic press for kitchen and domestic use.

BACKGROUND TO THE INVENTION

Many garlic presses have been proposed. Generally, they have some form of plunger which is forced down a barrel to squeeze and crush or mash the garlic against a perforated plate. In this way, the garlic becomes crushed and small pieces of flesh and the juice are forced through the perforations.

One very effective way in which the plunger can be forced along the barrel is disclosed in United Kingdom Pat. No. 2064947. As described there is a central plunger which is moved down within a surrounding barrel by the engagement of screw threads between the plunger and barrel. To assist crushing of the garlic and the forcing of the crushed garlic through the perforations, a blade may additionally be provided as described in our United Kingdom Pat. No. 2084862 which extends from the plunger into contact with the preforated plate, the blade being rotated relative the plate by the plunger.

Such a device works very well but there are still sometimes problems in extruding the last remnants of the crushed garlic. We have found that one reason for this seems to be because the perforations are provided in a metal plate having a surrounding flange engaging the lip of the barrel. As a result, there is an annular region around the edge in which small pieces of crushed garlic can accumulate and these pieces tend to block the final advance of the plunger.

It is therefore an object of the present invention in one aspect to provide a press for garlic or the like where this problem is avoided.

BRIEF SUMMARY OF THE INVENTION

According to the invention there is provided a device for crushing, mashing and/or grinding foodstuff, such as garlic comprising a hollow cylindrical housing along which a central plunger or ram can be forced to one end of the housing, the ram having an inner end which mates tightly with the cylindrical wall of the housing, a perforated rigid grinding plate covering the said one end of the housing and extending over the said one end of the housing and being joined externally to the housing, so mating with it to give a substantially crevice-free circular line join, the said inner end of the ram having a shape which mates closely with the inner surface of the grinding plate so that when the plunger is advanced fully to the said one end of the housing substantially all of the garlic or like product is forced through the perforations in the grinding plate, and mating screw threads between the ram and housing for advancing the ram upon twisting of the ram and housing relative one another.

For simplicity, a device according to the invention will hereinafter be called a "garlic press".

Garlic presses constructed in this way have no holes or crevices at the said one end of the housing into which pieces of garlic or the like can be trapped and prevent full advance of the plunger.

For reasons of hygiene and costs, it is desirable that the garlic press be made completely from synthetic plastics material and this includes the grinding plate which can be of a rigid and hard synthetic plastics material such as nylon. The latter is for example joined to the said one end of the housing by means of an external screw thread so that it can quickly and easily be disassembled for cleaning. Further the edge of the said one end of the housing should mate closely with the inside face of the grinding plate so as to avoid any crevices at the join between the two in which pieces of garlic or the like can be trapped. The inner face of the grinding plate and its mating face on the ram can both be substantially flat.

The holes in the grinding plate can be tapered in the direction of expulsion of the garlic.

The housing is preferably in the form of a cylinder of constant internal diameter into which the plunger fits closely. The inner end of the plunger can be a separate part of resilient material which fits tightly against the inner wall of the housing. In this connection, the peripheral edge may be curved slightly outwardly to give a good seal.

The mating threads between the plunger and the housing can be of the full internal diameter of the housing and therefore a very powerful mechanical advantage can be provided so that with relatively small rotating or twisting forces, the user can apply extremely high crushing forces on the garlic or the like without risk of damage to the components of the press even when they are made of synthetic plastics material rather than metal. The mating threads are desirably provided over a portion of the housing at the end away from the said one end and a corresponding portion of the ram or plunger so that the inner end of the plunger slides over a smooth inner wall of the housing.

Another problem which has come to light in the use of the garlic press shown in our U.S. Pat. No. 2,084,862 is that partially crushed garlic retained in the press for use at a later time will dry out and become harder to crush. Also the smell of crushed garlic is not always appealing.

According to another aspect of the invention therefore it is an object to overcome or mitigate these disadvantages.

According to this aspect of the invention this is achieved by a device for crushing, mashing and/or grinding foodstuffs such as garlic, comprising a hollow cylindrical housing, and movable along that housing by mating screw threads, a central plunger or ram, rotation of the plunger relative the housing advancing the plunger towards one end, that one end being provided with a perforated grinding plate through which crushed garlic or the like is forced, the housing at or near that said one end being provided with an outwardly flared skirt, and a cover removably joined to that skirt so as to enclose the said one end of the housing and the grinding plate, the cover having a substantially flat outer surface on which the device can stand on a flat surface with the axis of the housing and plunger substantially upright.

Preferably the cover is joined by a screw thread, bayonet fitting, snap fitting or the like so that it can quickly be removed or replaced and it therefore provides an enclosed region which prevents the drying out of any remaining garlic or the like and also encloses the small of the garlic. Further the cover provides a neat arrangement whereby the device can stand conveniently upright on a surface ready for use.

BRIEF DESCRIPTION OF THE DRAWINGS

A garlic press according to the invention will now be described, by way of example, with reference to the accompanying drawings, in which:

FIG. 2 is a view similar to FIG. 1 but with the lower cover removed and the plunger advanced;

FIG. 4 is an end view taken in the direction of the arrow 4 of FIG. 2; and

FIG. 5 is a detail section of part of the plunger.

DESCRIPTION OF THE PREFERRED EMBODIMENT

Figure 1:
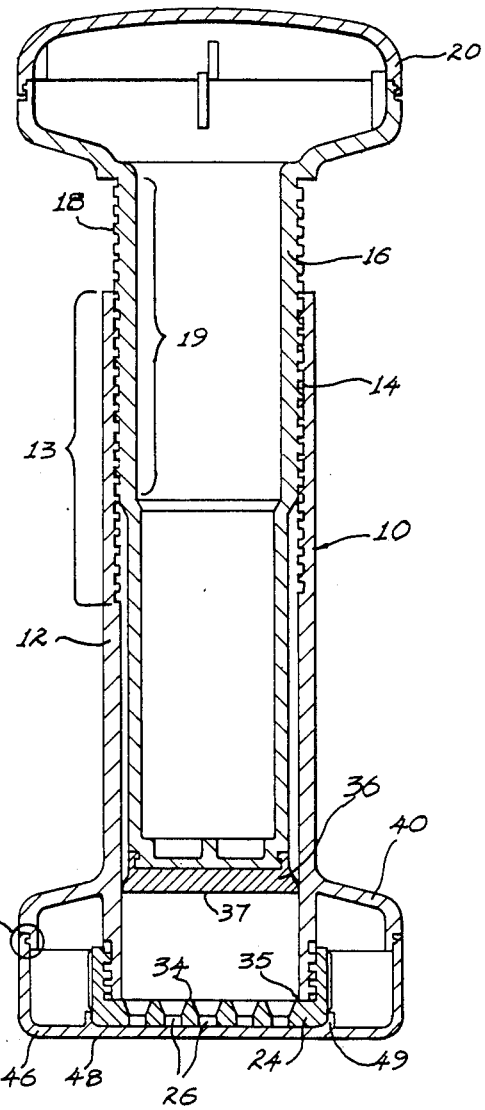
FIG. 1 is a sectional elevation of the press.

The garlic press 10 shown in the drawings includes a cylindrical barrel 12 preferably made in this example from a transparent synthetic plastics material. The barrel is open at both ends. Over the region 13 from its upper end, the barrel has an internal screw threading 14. A cylindrical plunger 16 slidably fit within the hollow barrel and has an outer screw threading 18 over the region 19 near its upper end mating with the internal screw threading 14. At its upper outer end the plunger 16 has an enlarged circular head 20 for a user to grasp to twist it relative the barrel 12.

Covering the open lower end of the barrel 12 is a grinding plate 24 made of a rigid and hard synthetic plastics material such as nylon. The grinding plate is of bowl shape and through the flat base portion 24a are a number of holes 26 for the expulsion of the crushed garlic. These holes taper over a first portion 26a in the direction in which garlic is expelled to assist expulsion of the garlic. The base portion 24a fits tightly over the lower end of the barrel 12 and the sides 24b of the bowl shaped plate embrace the outside of the lower end of the barrel and an internal screw thread 27 which engages an external screw thread 28 on the lower end of the barrel. To assist in screwing and unscrewing the plate 26 from the end of the barrel, a number of small spaced ribs 29 are provided on the outer surface of the side 24b of the plate 24.

The lower edge of the barrel engages closely with the internal surface 34 of the grinding plate 24. There is therefore a circular line of contact 35 between the two but no crevices of any substantial size into which pieces of crushed garlic or the like can become trapped. Also the plate 24 can be quickly and easily removed for cleaning both of itself and its holes 26 and the lower end of the barrel.

The lower end of the plunger is provided with a disc seal 36. This is made separately from the rest of the plunger of a resilient synthetic plastics material such as low density polyethylene and has a flat circular undersurface 37 which will mate closely with the surface 34 of the plate 24 when the plunger is in its fully advanced position and so will ensure expulsion of all garlic being crushed into the holes 36 since as shown in FIG. 2 there is no space left between the surfaces 34 and 37. The disc seal 36 has a circular edge 38 which as best seen in FIG. 5, is a slightly curved wiping edge so that it is forced very tightly into engagement with the inside wall of the barrel which in that region is a smooth cylindrical shape since the threading 14 does not extend past the region 13. The edge 38 is rather line a feather edge. It therefore seals tightly against that wall so that no liquid or solid from the garlic can escape past the edge as the plunger advances.

Figure 3:
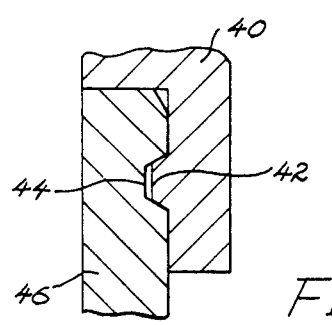
FIG. 3 is an enlarged detail section of the region within the circle marked 3 in FIG. 1.

Integrally formed near the lower end of the barrel is an outwardly flared skirt 40, the terminus of which has a cross sectional area significantly greater than the cross-sectional area of the housing. At its lower end the skirt has a portion of reduced diameter with a small outwardly projecting ring 42 (see FIG. 3). The latter is a snap fit in an annular recess 44 on a cover 46. The cover is therefore readily removable but equally can be attached to the skirt 40 to encompass the lower end of the barrel 12 and grinding plate 24. In addition the cover 46 has a substantially flat lower surface 48. The whole press can therefore stand upright on the surface 48 when the cover is in place before or after use. The presence of the cover provides an enclosed region which prevents or reduces drying out of any garlic remaining in the press after use and before re-use. Also it reduces or avoids the somewhat unpleasant smell of garlic when the press is not in use.

The garlic press 10 is very simple to use. Initially the plunger 16 is withdrawn up the barrel 12 by twisting the head 20 relative the barrel. When it has been sufficiently withdrawn to insert some fresh garlic bulbs, the plate 24 can be unscrewed from the end of the barrel and the garlic bulbs inserted. The plate 24 is then screwed back firmly to the lower end of the barrel. To expel crushed garlic and garlic juices, the user then grasps the barrel with one hand and twists the head 20 to cause the plunger to advance down the barrel. The disc seal 36 contacts the garlic bulbs and gradually compresses and crushes them between the surfaces 37 and 41 and crushed garlic and juices are expelled through the holes 26.

When the user has expelled sufficient garlic for any one use, the cover 46 can be snapped back into place to prevent unpleasant garlic smell eminating from the press and also to prevent the garlic from drying out. It will be noted that the cover fits closely against the underside of the plate 24 and an upstanding circular lip 49 enters the cover so that the garlic is kept in a small volume out of contact with the outside atmosphere.

As the plunger approaches the lower end of the barrel, substantially all of the garlic can be expelled because the disc seal 36 fits tightly against the wall of the barrel and in addition the surfaces 37 and 34 mate closely when the plunger is in its fully advanced position. Once all of the garlic has been expelled, the plunger can again be retracted and plate 24 unscrewed to be washed and cleaned and fresh garlic inserted.

An advantage of the invention is that all of the component parts can be made from synthetic plastics material and so they can all be kept clean and hygienic.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A device for crushing, mashing and/or grinding foodstuff, such as garlic, comprising:
   a hollow cylindrical housing with an external screw thread extending from a first end thereof, and an internal screw thread adjacent a second end thereof, a central ram of length substantially equal to the length of the housing and of cross-section substantially equal to the inner cross-section of the housing, the ram having an external screw thread along a part of its length threadingly engaging said internal screw thread on the housing such that twisting of the ram relative to the housing advances or retracts the ram in the housing, an inner end to said ram which mates tightly with said hollow cylindrical housing, a cup-shaped member having a perforated rigid grinding plate which covers the said first end of said housing, and a cylindrical wall portion extending from the plate, said wall portion having an internal screw thread matingly engaging said external screw thread on the housing, the cup-shaped member being removably mounted on said first end of the housing by means of said screw threads whereby said plate mates with said first housing end to give a substantially crevice-free circular line join, said inner end of the ram having a shape which mates closely with the inner surface of said grinding plate so that when said ram is advanced fully to said first end of said housing substantially all of the foodstuff is forced through the perforations in said grinding plate.

2. A device according to claim 1 in which said inner end of said ram further comprises a resilient peripheral circular edge which seals closely with the internal cylindrical wall of said housing.

3. A device according to claim 1 in which said cup-shaped member is made of a rigid and hard synthetic plastics material.

4. A device according to claim 1 further comprising an enlarged diameter handle at the outer end of said ram to assist the user in twisting said ram relative said housing to advance and retract said ram along said housing.

5. A device according to claim 1 further comprising a removable cover joined to the housing and covering said first end thereof and said grinding plate.

6. A device according to claim 5 further comprising at the said first end of said housing an outwardly flared skirt, and means for removably, joining said cover to that skirt so as to enclose said first end of said housing and said grinding plate.

7. A device according to claim 6 in which said cover has a substantially flat outer surface so that said device can stand on a flat surface with the axis of said housing and ram substantially upright.

8. A device according to claim 1 wherein the second end of the housing is provided with said internal screw thread and the inner surface of the first end is substantially smooth, said ram having an upper end portion with said external screw thread mating with said internal screw thread on said housing.

9. A device for crushing, mashing and/or grinding foodstuffs such as garlic, comprising:

a hollow cylindrical housing with an external screw thread extending from a first end thereof, and an internal screw thread adjacent a second end thereof, a central ram of length substantially equal to the length of the housing and of cross-section substantially equal to the inner cross-section of the housing, the ram having an external screw thread along a part of its length threadingly engaging said internal screw thread on the housing such that twisting of the ram relative to the housing advances or retracts the ram in the housing, and having an inner end which mates tightly with the inner surface of said housing, a cup-shaped member having a perforated grinding plate which covers said first end of said housing through which said foodstuff is forced, and a cylindrical wall portion extending from the plate, said wall portion having an internal screw thread matingly engaging said external screw thread on the housing, the cup-shaped member being removably mounted on said first end of the housing by means of said screw threads, an outwardly flared skirt at that said first end of said housing, said skirt surrounding said external screw thread and cup-shaped member, and a cover removably joined to said skirt so as to enclose said first end of said housing and said cup-shaped member, said cover having a substantially flat outer surface on which the device can stand on a flat surface with the axis of said housing and ram substantially upright.

10. A device according to claim 9 wherein the second end of the housing is provided with said internal screw thread and the inner surface of the first end is substantially smooth, said ram having an upper end portion with said external screw thread mating with said internal screw thread on said housing.

11. A device for crushing, mashing and/or grinding moist foodstuff comprising:

a hollow cylindrical housing with an external screw thread extending from a first end thereof and an internal screw thread adjacent a second end thereof;

a central ram of length substantially equal to the length of the housing and of cross-section substantially equal to the inner cross-section of the housing, the ram having an external screw thread along a part of its length threadingly engaging the internal screw thread on the housing such that twisting of the ram relative to the housing advances or retracts the ram in the housing;

a seal disposed on an inner end of the ram, the seal having a resilient peripheral edge which mates tightly with the hollow cylindrical housing so that no liquid or solid from the food stuff can seep past the edge as the ram is advanced in the housing;

a cup-shaped member having a perforated rigid grinding plate which covers the first end of the housing, the cup-shaped member having a cylindrical wall portion extending from the plate, the wall portion having an internal screw thread matingly engaging the external screw thread on the housing, the cup-shaped member being removably mounted on the first end of the housing by means of the screw threads so that the plate mates with the first housing end to give a substantially crevice-free circular line join;

the inner end of the ram having a shape which mates closely with the inner surface of the grinding plate so that when the ram is advanced fully to the first end of the housing substantially all of the foodstuff is forced through the perforations in the grinding plate.

12. The apparatus according to claim 11 wherein the resilient peripheral edge curves toward the first end of the housing and mates tightly with the housing so that no liquid or solid from the foodstuff can seep past the edge as the ram is advanced in the housing.

13. The apparatus according to claim 12 further comprising an outwardly flared skirt disposed at the first end of the housing and having a terminus which has a cross-sectional area significantly greater than the cross-sectional area of the housing.

14. The apparatus according to claim 13 further comprising:

a cover having a cross-sectional shape substantially the same as a cross-sectional shape of the terminus of the skirt; and means for removably joining the cover to the skirt so as to enclose the first end of the housing and the grinding plate;

wherein the cover has a substantially flat outer surface so that the device can stably stand on a flat surface with the axis of the housing and the ram substantially upright.

* * * * *